July 29, 1958      T. LAUFER      2,845,131
ROTOR ARRANGEMENT FOR ROTARY WING AIRCRAFT
Filed June 7, 1954      2 Sheets-Sheet 1
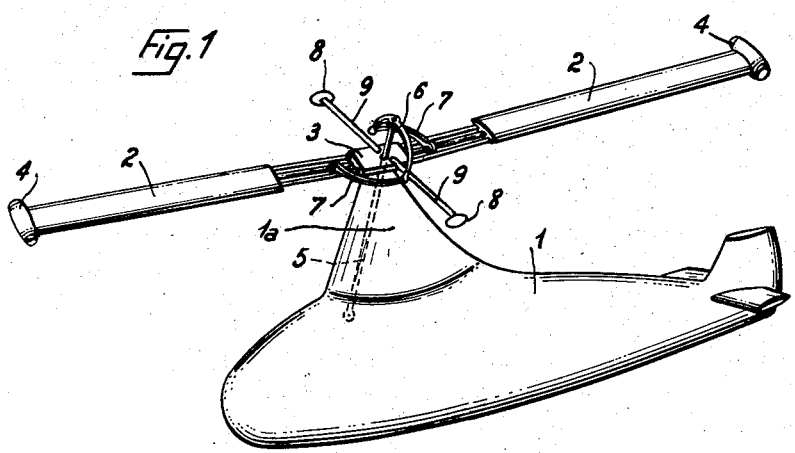
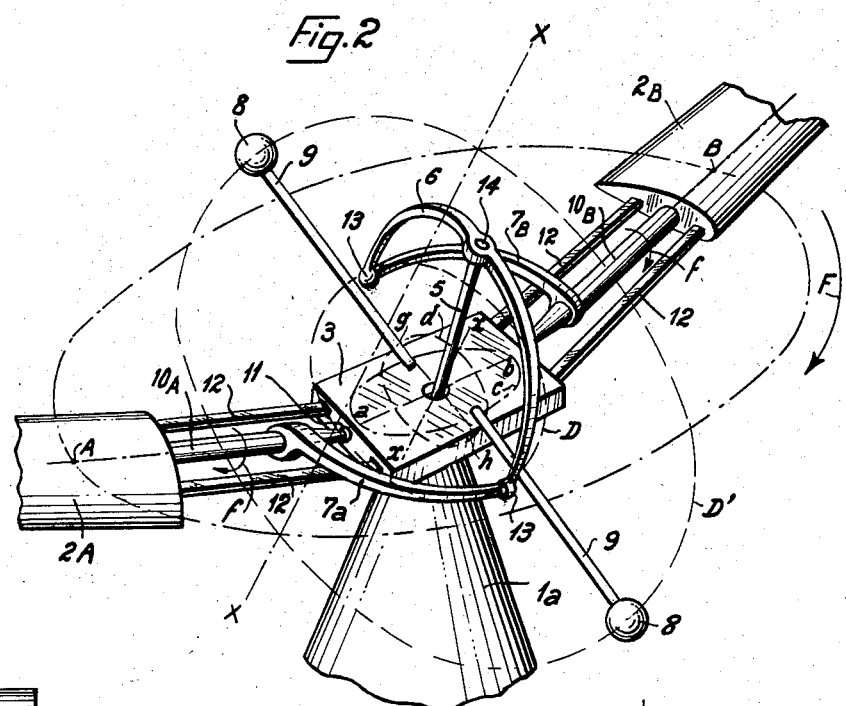
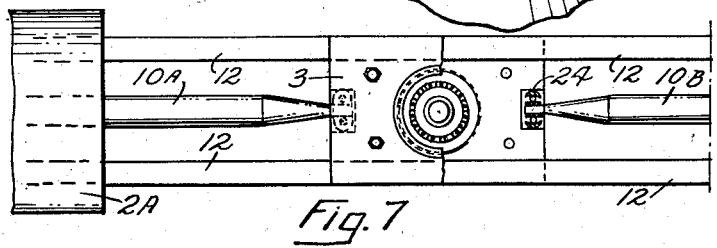
Inventor
Theodor Laufer
by Brown & Seward
Attorneys

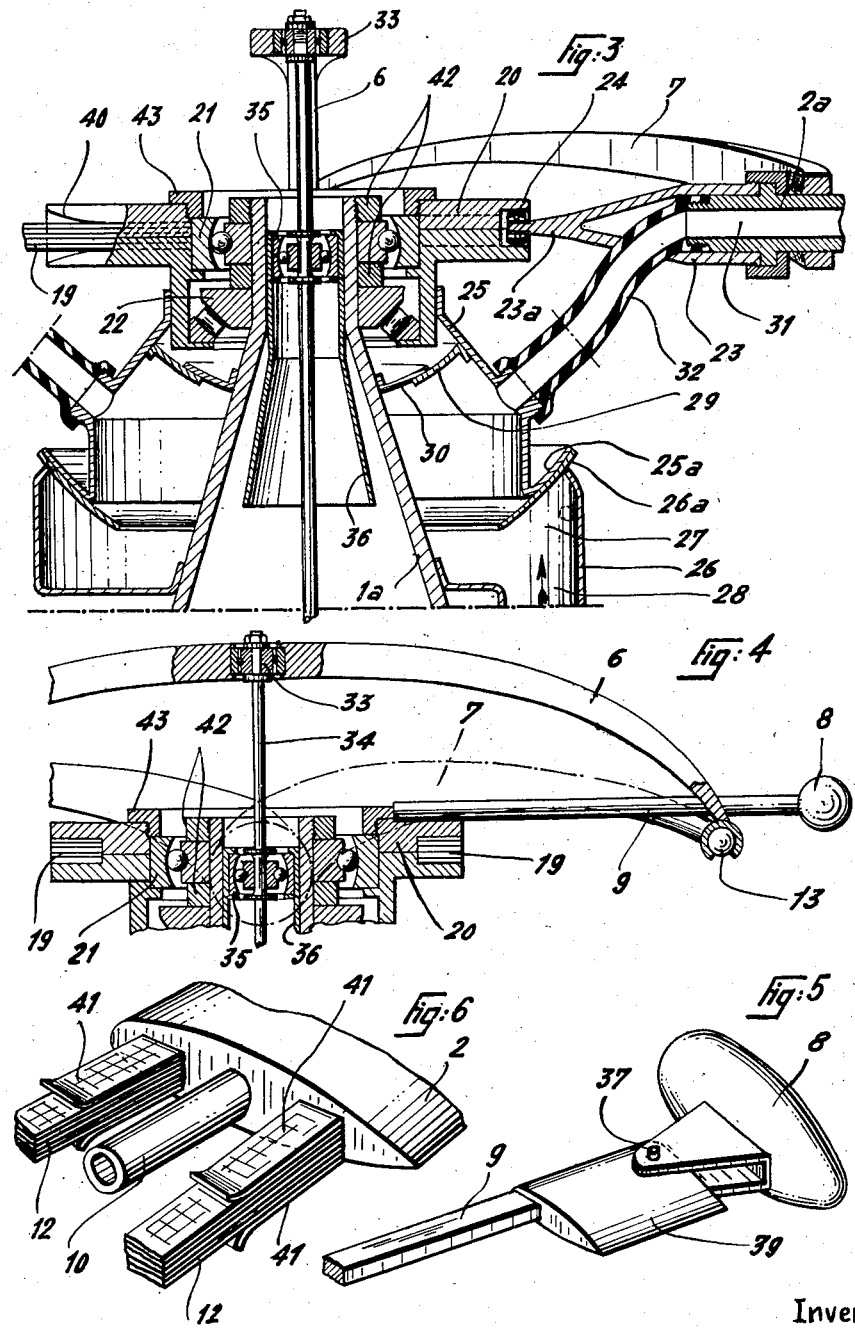

United States Patent Office 2,845,131
Patented July 29, 1958

2,845,131

ROTOR ARRANGEMENT FOR ROTARY WING AIRCRAFT

Theodor Laufer, Neuilly-sur-Seine, France, assignor to Societe Nationale de Constructions Aeronautiques du Sud-Ouest, Paris, France, a company of France Application June 7, 1954, Serial No. 434,925

Claims priority, application France June 11, 1953

10 Claims. (Cl. 170—160.13)

This invention relates to rotary wing aircraft and, more particularly, to a rotor arrangement for such aircraft.

Rotary wing aircraft, such as helicopters, are inherently unstable, in particular at low speed and in hovering flight.

This is due to the fact that any perturbation in the position of the blades causes an unwanted variation in the cyclic pitch which, in turn, tends to increase the perturbation.

A number of stabilizing devices have been devised in efforts to overcome this drawback. In particular, it has been proposed to incorporate in the blades cyclic pitch control a gyroscopic device which, upon a perturbation of the position of the blades opposes its inertia to the said unwanted variation of the cyclic pitch. Unfortunately, such a gyroscopic device resists as well the useful variations deliberately imparted to the pitch of the blades for piloting purposes.

The invention has for its purpose to provide a rotor arrangement for a helicopter or the like, which is so designed as to increase the stability without impairing the maneuverability.

An object of the invention is therefore to provide a rotor arrangement essentially comprising a diametrally extending balancer freely pivoted on the fuselage of the aircraft through a swivel joint, two diametrically opposed suitably driven blades and an attachment system to secure said blades on said balancer with articulation of said blades about flapping axes parallel to or coinciding with said balancer and about pitch axes at right angles to the same, the usual cyclic pitch control acting directly upon the blades.

Another object of the invention is to provide a rotor arrangement of this type, in which the above-mentioned attachment system includes means to exert between the balancer and each blade about the pitch axis of the latter a returning torque proportional to the angular deviation of the blade from a mean nominal pitch with respect to the balancer.

In a preferred embodiment, the above-mentioned attachment system is constituted for each blade by a pair of flexible elements attached to the balancer and the blade on either side of the pitch axis of the latter. These flexible elements are arranged to extend in a common plane parallel to the balancer for the above mentioned mean nominal pitch of the blade. As the pitch of the blade is varied, said elements are twisted together and the centrifugal force, due to rotation of the whole assembly tends to untwist them to bring them back into said common plane. Thus, the above-mentioned returning torque applied between the balancer and the blade is proportional to the centrifugal force.

Alternatively, said flexible elements may be constituted by spring leaf laminations adding their own elasticity to the untwisting effect of the centrifugal force.

The above described balancer may be pivoted on the fuselage of the aircraft through a flat hub on which the blades are then secured so that their flapping axes extend in directions parallel with and equidistant from said balancer. In such a rotor arrangement, the hub has a low inertia about the axis of the balancer and a considerable inertia around the pitch axes of the blades. As the wing rotates, the diameters of the hub contained in the diametral plane of the pitch axes are maintained, under the action of the symmetrical centrifugal forces, in a plane substantially parallel to the blade tip path plane.

If the blades are given equal pitches with respect to the hub, the returning torques exerted by the attachment system of the hub are equal and opposite so that the general pitch control has no influence upon the position of the hub.

However, when the cyclic pitch is so controlled as to introduce unequal incidences of the blades (horizontal flight control), the above mentioned return torques are varied in the same direction, so that they tend to modify the position of the hub. As, however, the control of the blades is independent of the position of the hub, said control takes place immediately, while the hub is brought slowly to its new position of equilibrium.

In other words, with the rotor arrangement according to the invention, the control of the blades, both for horizontal and vertical flights, remains practically as easy as if the balancer were not present, while, when the rotary wing is in equilibrium, a perturbation of the relative position of said wing with respect to the nacelle is practically without any influence on the cyclic pitch if the pilot does not hold the stick.

Other objects and advantages of the invention will be better understood from the following detailed description together with the accompanying drawings in which there is represented an arrangement of the invention.

In these drawings:

Fig. 1 is a diagrammatic elevational view of a helicopter provided with a rotor arrangement according to the invention, Fig. 2 is an enlarged detail perspective view of said rotor arrangement, Fig. 3 is a sectional view, in a plane containing the pitch axes of the blades, of a practical embodiment of the hub of said rotor arrangement, Fig. 4 is a sectional view of said hub in a plane at right angles to that of Fig. 3, Fig. 5 is a perspective view of an alternative construction of the balancer of the rotor arrangement, Fig. 6 is a perspective view of an attachment system of a blade.

Fig. 7 is a view of the hub showing the leaf laminations of Fig. 2 as clamped between the plates of the hub 3.

The fuselage of the helicopter shown in Fig. 1 is provided with a rotor arrangement according to the invention, which is essentially constituted by two diametrically opposed blades 2, attached to the hub 3 pivoted through a swivel-joint at the top of a mast 1a of the nacelle.

In the example shown, the wing is rotated by means of blade tip jets 4. However, it is to be understood that other more or less conventional driving means may be adopted as well, within the scope of the invention.

The helicopter is piloted by means of a long stick 5 pivoted at 14 on a web 6, or other conventional cyclic pitch control device. Web 6 actuates levers 7 which, in turn, determine the position of the blades about the pitch axis. On the hub 3 are fixedly secured, along a diameter at right angles to the pitch axes, two equal and symmetrical masses 8 carried at the outer ends of rigid arms 9 implanted in hub 3 and constituting together a balancer, as explained hereunder.

As shown in Fig. 2, the blade roots 10A and 10B of the blades 2A and 2B, respectively, are articulated on the hub 3 by means of swivel joints 11 permitting freedom of the blades about the flapping and pitch axes, respectively. The blades are furthermore and primarily attached to the hub through flexible and elongated elements 12, which, for the mean nominal pitch of the blades with respect to the hub, are in a common plane containing the direction of the centrifugal force and, in the example shown, parallel to the blade roots 10A and 10B. Said elongated elements may be constituted, e. g., by cables or, as described with reference to Figs. 3 and 4, by spring leaf laminations.

With this arrangement, the blades are free to oscillate around their flapping axis, but any angular displacement of a blade with respect to the above mentioned mean pitch causes a twisting of elements 12, thus generating a return torque between the relevant blade and the hub 3. For example, when the stick 5 is displaced in order to vary the pitch of the blades through web 6 (which is freely rotated by means of a bearing 14 at the top end of lever 5) each pair of flexible attachments 12 is twisted and, due to the centrifugal forces acting on the blades, said twisted attachment exerts, between the hub and the relevant blade a returning torque about the pitch axis of the latter.

In order to avoid any material perturbation of the blade pitch upon flapping motion of said blades, the straight line passing through the swivel joints 13 is substantially parallel to the flapping axes of the blades. As an incidental result of this arrangement, said swivel joints 13 are located substantially in the same diametral plane of the hub as masses 8.

When the wing rotates as shown by arrow F, the tips of the blades and, more generally, two corresponding points A and B of blades 2A and 2B, respectively, approximately describe circles located in planes parallel to a plane containing the pivot point of the rotor arrangement and right-angled with the axis of rotation of the same, which I will call hereunder "the rotor plane," as distinguished from the blade tip path plane. This is due to the fact that, among all the stresses acting upon the blades, the centrifugal force overcomes all other ones. As moreover, said centrifugal force is substantially the same for both blades, these two equal and opposite centrifugal forces are essentially transmitted to the hub through the elongated flexible elements 12, so that the diameter $a$—$b$ of the hub describes a circumference $c$, substantially located in said rotor plane. When the flexible elments 12 are not twisted or when they are twisted in opposite directions by the same angle (mean pitch), the hub as a whole also rotates in the rotor plane. This is the case in hovering and vertical flight.

When, however, as shown in Fig. 2, the lever 5 is inclined by the pilot, a cyclic pitch variation is imparted to the blades and the swivel joints 13 describe a circle D located in a plane known under the name of "no-feathering plane" which is not parallel to the rotor plane.

In the position shown in Fig. 2 both blades have been tilted about their longitudinal axes in the direction of arrows $f$, so that the returning torques exerted by both pairs of flexible attachments 12, now act in the same direction on hub 3, which, as a result, is subjected to a tilting torque about its diameter $a$—$b$.

Now, due to the inertia of masses 8, tilting of the hub does not take place instantaneously but progressively. This tilting motion goes on until diameter $g$—$h$ at right angles to diameter $a$—$b$ of said hub is brought substantially in a position parallel with the no-feathering plane.

In other words, whenever the relative position of the rotary wing and the fuselage happens to be perturbated, the direction in space of the no-feathering plane is held unaltered by the balancer which acts on the cyclic pitch control to set the same in such a manner as to preserve the original cyclic pitch.

This is particularly true when the horizontal flight speed of the airplane is small or even nil, i. e. when the no-feathering plane is practically parallel to the rotor plane. In this case, in a state of equilibrium, both pairs of elements 12 are either not twisted or twisted oppositely and by the same angle, so that as soon as the rotor plane ceases to be parallel with the no-feathering plane, due to any perturbation, returning torques immediately appear between the hub and the blades to bring the swivel joints 13 of the web back into said no-feathering plane.

Since, at this moment, the cyclic pitch is nil, which permits leaving the stick uncontrolled without any risk, the position of said lever is automatically corrected to maintain the cyclic pitch to zero value. Thus, in hovering or vertical flight, the airplane is stable, without any control of the lever, since a perturbation does not modify the value (practically nil) of the cyclic pitch.

The rotor arrangement according to the invention is particularly well adapted to be used, as shown in Figs. 3 and 4, in combination with a rotary wing driven by means of blade tip jets.

In the embodiment shown in Figs. 3 and 4, the hub is constituted by a flat rectangular member 20 constituted by two elements assembled together and between which are clamped spring leaf laminations 19 constituting the above described flexible attachments between the hub and the blades.

Each spring leaf lamination runs uninterrupted from one blade to the other through the hub, so that the latter is completely relieved from centrifugal forces which affect only the blades.

In order to avoid shearing of the spring leaves at their point of penetration into the hub, the bores through which said penetration takes place are suitably flared out, as shown, e. g. on the left-hand portion of Fig. 3 at 40.

In order to avoid shearing of the spring leaf laminations 19 under alternative stresses, where said laminations are implanted in the blades, the corresponding ends of said laminations are clamped between two more rigid leaves 41, secured to the internal edges of blades 2, as shown in Fig. 6.

The flat member 20 is pivoted on the mast 1a through a swivel bearing 21 and another bearing 22 provided with barrel-shaped rollers and having the same centre as bearing 21. The latter ensures centering of the hub with respect to the mast, while bearing 22 transmits to the fuselage the lift action of the rotary wing. The cage of bearing 22 is fast with member 30, while its spherical rolling path is secured on the mast 1a. Cross-members 42 and a threaded ring 43 hold the whole assembly.

The blade roots 10 on which the levers are keyed are secured in a tulip-shaped member 23, the tapering end 23a of which is articulated and freely rotated in a small swivel-bearing 24 which is freely slidable axially to a limited extent. Bearing 24 which is not subjected to any centrifugal force may be of a very small size.

The hub 3 is formed with a flaring skirt 25 terminating in a spherical lip 25a concentric with both bearings 21 and 22. Said lip is in sliding contact relation with a spherical dish 26a which constitutes the upper edge of a casing 27, the outer wall 26 of which surrounds the mast 1a. A duct 28 is provided for feeding compressed gas into said casing.

The tightness of said casing is completed by a spherical flange 29 internally secured to skirt 25 and cooperating with the outer face of another flange of same radius 30 fast with the mast 1a.

The casing 27 and the space enclosed within skirt 25 communicate with inner passages 31 provided in blades 2 through supple pipes 32 allowing free displacements of the blades. This system ensures the feeding of the jets disposed on the tips of the blades and communicating with the above-mentioned passages 31. The control of the blades is ensured by web 6 which, as already mentioned, is freely rotated through a bearing 33 on a control rod 34 (corresponding to stick 5 of Figs. 1 and 2), which, by means of a swivel bearing 35 ensures, when inclined, a cyclic control of the pitch. The outer cage of bearing 35 is carried in a tube 36 slidably mounted in the tubular portion of the top of the mast, to permit control of the mean pitch. An upward or downward displacement of said tube causes, respectively, lifting or lowering of web 6 and hence warping in the same direction of both blades.

The masses 8 are secured at the outer ends of rigid arms 9 which are secured, in turn, on the upper face of member 20. However, in a rotary wing of this type, due to nutation phenomena, if the blades rotate with a uniform motion, the balancer, when rotating in a plane which is not parallel to that of the blades, is subjected to sinusoidal speed variations. As a result, the masses 8 are twice accelerated and twice decelerated during each turn, which may give rise to inertia stresses affecting the resistance of arms 9.

In order to reduce the importance of said inertia stresses, it is possible, as shown in Fig. 5, to attach each mass 8 at the end of the relevant arm 9 through an articulation 37, with respect to which mass 8 is located outwardly.

Moreover, in order to damp the oscillations of the balancer upon deliberate variation of the cyclic pitch control and to increase the inertia of said balancer when it acts as a stabilizer, arms 9 may be advantageously provided with streamlined ailerons 39 extending in a general plane substantially right-angled with the axis of rotation of the hub. Such ailerons have no thrust and their drag is negligible when the balancer rotates in stabilized position but they give rise to stabilizing aerodynamic thrusts, as soon as the plane of rotation of the balancer tends to be modified. It is to be understood that the invention is not limited to the embodiments described and shown and that it may be put into effect with numerous modifications within the reach of those skilled in the art without departing from the scope of the invention.

What is claimed is:
1. A rotor arrangement for a rotary wing aircraft having mean and cyclic pitch control means comprising, in combination, two diametrically opposed suitably driven blades, a balancer extending in a diametral plane substantially at right angles to the aligned longitudinal axes of said blades, an attachment system to secure said blades to said balancer for pitch adjustment about said longitudinal axes and for free flapping each about an axis at right angles to said longitudinal axis, means including a swivel joint to pivot said balancer on said aircraft, said attachment system including means to exert, between said balancer and each blade, a returning torque urging both said balancer and said blades towards a relative position corresponding to a well-defined nominal pitch of said blades with respect to the plane of rotation of said balancer and means to operatively connect said blades directly with said pitch control means.

2. A rotor arrangement according to claim 1, wherein said attachment system is essentially constituted, for each blade, by two flexible elongated elements, so secured to said blade and balancer as to extend, when acted upon by centrifugal force, for said nominal pitch, in a common plane containing the line of action of the centrifugal force resulting from the rotation of said blade.

3. A rotor arrangement according to claim 1, in which said balancer includes a hub member and said attachment system is so designed that said hub member is subjected upon rotation of said blades to equal, opposite and symmetric centrifugal forces tending to maintain said hub member in a plane parallel to the blade tip-path plane.

4. A rotor arrangement according to claim 1, wherein said attachment system is essentially constituted for each blade by two spring leaf laminations extending, for said nominal pitch, in a common plane containing the line of action of the centrifugal force resulting from the rotation of said blade.

5. A rotor arrangement according to claim 4, wherein said spring leaf laminations are formed to constitute a single pair of laminations, each of which runs uninterruptedly from one blade to the other through said balancer.

6. A rotor arrangement according to claim 5, wherein said balancer pivoting means include a hub, said attachment system being so designed that said hub is subjected upon rotation of said blades to equal, opposite and symmetric centrifugal forces tending to maintain said hub in a plane parallel to the blade tip path plane, and wherein flared bores are provided on either side of said hub to receive said laminations, whereby flapping of said blades does not cause any shearing effect on said laminations.

7. A rotor arrangement according to claim 1, wherein said attachment system includes for each blade a blade root and a swivel joint to attach said blade root to said balancer with free articulation of said blade about said flapping and pitch axes.

8. A rotor arrangement according to claim 1, wherein said balancer includes two diametrically opposed rigid arms of equal length and two masses of equal weight, each articulated at the outer end of one of said rigid arms, about an axis at right angles to the plane of rotation of said balancer.

9. A rotor arrangement according to claim 1, wherein said balancer includes two diametrically opposed rigid arms of same length and two ailerons fixedly secured on said arms at the same distance from the rotation axis of said balancer, in a general plane substantially parallel with the plane of rotation of said balancer, with their leading edges facing opposite directions.

10. A rotor arrangement according to claim 9, further comprising two masses of equal weight each articulated at the outer end of one of said rigid arms about an axis at right angles to the plane of rotation of said balancer.

References Cited in the file of this patent
UNITED STATES PATENTS

| | | |
|---|---|---|
| 2,368,698 | Young | Feb. 6, 1945 |
| 2,633,924 | Young | Apr. 7, 1953 |
| 2,684,722 | Perry | July 27, 1954 |